United States Patent [19]
Lawson et al.

[11] 4,035,324
[45] July 12, 1977

[54] SMOKE-RETARDANT CHLORINATED POLYMER COMPOSITIONS

[75] Inventors: David Francis Lawson; Edward Leo Kay, both of Akron, Ohio

[73] Assignee: The Firestone Tire & Rubber Company, Akron, Ohio

[21] Appl. No.: 683,600

[22] Filed: May 5, 1976

[51] Int. Cl.$^2$ .................................... C08K 3/38
[52] U.S. Cl. .................... 260/23 XA; 260/31.8 R; 260/45.75 R
[58] Field of Search ............... 260/45.75 R, 42.44, 260/42.47, 42.49, 31.8 R, 23 XA; 526/344, 345

[56] References Cited
U.S. PATENT DOCUMENTS

| | | | |
|---|---|---|---|
| 2,157,997 | 5/1939 | Brous | 260/45.75 R |
| 2,507,142 | 5/1950 | Chaban | 260/45.7 R |
| 2,661,346 | 12/1953 | Wesp et al. | 260/45.75 R |

Primary Examiner—V.P. Hoke

[57] ABSTRACT

The addition of Manganese borate ($Mn\,B_4\,O_7$) to flexible vinyl chloride resin compositions greatly reduces the evolution of smoke when the compositions undergo combustion processes.

7 Claims, No Drawings a flame-retardant is well known in the industry (Plastics Technology 20 (8) pp. 41–47 (1974)).

SMOKE-RETARDANT CHLORINATED POLYMER COMPOSITIONS

BACKGROUND OF THE INVENTION

There is much art on flame-retardants, but little on smoke-retarders or suppressants. A paper entitled SMOKE GENERATION FROM THE BURNING OF SOME POLYMERIC MATERIALS by Brauman et al., given at the 32nd Annual Technical Conference of the Society of Plastic Engineers held in San Francisco in May 1974 discusses the problem and the effect of several smoke deterrents, but does not suggest the invention. The use of zinc borate ($2ZnO.3B_2O_3.3.5\ H_2O$) as a flame-retardant is well known in the industry (Plastics Technology 20 (8) pp. 41–47 (1974)).

Patents on smoke retardants include, for example, Frisch U.S. Pat. No. 3,725,319 and Doerge et. al. U.S. Pat. Nos. 3,746,664 and 3,758,638, but these include no suggestion of the invention.

SUMMARY OF THE INVENTION

It has been found that manganese borate is a very effective smoke suppressant when added to flexible chlorine-containing polymer formulations, including formulations containing chlorinated polyethylene and propylene, chlorinated rubber, etc., and especially flexible formulations containing vinyl chloride polymers. The chlorine content of homopolymers of vinyl chloride is about 57 percent w/w. If copolymers of vinyl chloride are used, the chlorine content is less if the comonomer (such as vinyl acetate) does not contain chlorine, and is higher if the comonomer contains chlorine (such as vinylidene chloride). The chlorine content of chlorinated polyethylene or chlorinated polypropylene may vary over a wide range depending upon the physical properties of the polymer. Generally, a range of 5 to 40 percent w/w chlorine is present. The chlorine content of a flexible polyvinyl chloride composition will generally be less than 57 percent w/w since non-chlorinated plasticizer is generally present. A flexible polyvinyl chloride composition may be defined as one containing w/w 25–150 parts of plasticizer per 100 parts of the chlorine containing polymers. Thus, the chlorine-content of the polymer formulation as a whole may range from 10 to 75 per cent w/w. The incorporation of manganese borate ($Mn\ B_4O_7$) lessens the smoke generated by the burning polymer. One may use 1 to 10 parts by weight of manganese borate or more, if desired, per 100 parts of the polymer. Preferably there should be used 2 to 8 parts of the manganese borate.

Although the use of manganese borate as a smoke inhibitor for chlorinated resins in general appears to be novel, experimentation by the present inventors indicates that the smoke inhibiting effect of manganese borate in rigid, unplasticized polymer compositions is less pronounced than in plasticized, flexible, filled or unfilled compositions. The invention is, therefore, useful chiefly in plasticized compositions, which may be defined as compositions containing 25–150 parts by weight of a plasticizer per 100 parts by weight of the polymer. Plasticizers which may be present in the compositions of this invention include phthalates such as dibutyl phthalate, di(2-ethylhexyl) phthalate, di(docedyl) phthalate and the like, and phosphates such as tricresyl phosphate, tri(2-ethylhexyl) phosphate, triphenyl phosphate, and the like. In general, any of the plasticizers commonly used to plasticize polyvinyl chloride and other chlorine-containing polymers may be used.

Before referring to the results, it is advantageous to know the meaning of the terms utilized. Definitions follow.

NATIONAL BUREAU OF STANDARDS SMOKE DENSITY CHAMBER

Evaluations for the density of visible smoke were made using a commercial smoke density chamber modeled after one developed at the National Bureau of Standards by the Fire Research Group (see D. Gross, J. J. Loftus and A. F. Robertson, ASTM Special Technical Publication, 422 pages 166–204 (1969).) This chamber contains a radiant heater producing 2.5 $W/cm^2$ of heat at the surface of a 3 inch × 3 inch sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as specific Optical Density, $D_S$, where $$D_S = \frac{V}{AL} \log_{10} \frac{T_o}{T} = 132 \log_{10} \frac{T_o}{T}$$

$V$ = volume of chamber
$A$ = area of test specimen
$L$ = length of light path
$T_o$ = initial light transmittance through the chamber
$T$ = transmittance of light during test.

At the peak of smoke build-up $D_s = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 percent of $D_m$ (t.9 $D_m$) and the time (in minutes) to $D_S = 16$ ($t\ D_{16}$), which are indicative of the rate of smoke development (higher numbers signify slower rates), as well as the smoke obscuration number for the first four minutes of test, $SON_4$, where $$SON_4 = \frac{D_S\ (1\ min.) + D_S\ (2\ min.) + D_S\ (3\ min.) + D_S\ (4\ min.)}{4}$$

which also represents the early rate of smoke development (lower numbers mean less smoke).

In some of the tests, the burner was in operation in addition to the radiant heater, this configuration being designated "flaming condition". In other tests, the burner was off, this latter configuration being designated "non-flaming condition". The definitions of terms are summarized below.

$D_{mc}$ = Specific optical density at maximum smoke intensity, corrected for fogging of lens seals. $D_{mc} < 25$, light; 25–75, moderate; 100–400, dense; >400 very dense.

$t.9\ D_m$ = time (minutes) to reach 90 percent of maximum optical density.

$tD_{16}$ = time (minutes) to D = 16; corresponds to early visibility obscuration. $tD_{16} < 1$, very fast; 1–3 fast; 4–6 moderate; 7–10, slow; >10, very slow smoker.

$SON_4$ = Smoke obscuration number over first four minutes of test 4 indicates amount $$\left\{ \equiv \sum_{t=1}^{4} (D_t)/4 \right.$$

of smoke vs. rate of build-up early in the test. $SON_4 < 3$, very low; 4–10, low; 10–50, moderate; 50–100, high; >200, very high.

F = Flaming condition.
NF = Non-flaming condition.

LOI is the abbreviation for "Limiting Oxygen Index" which is defined as the minimum volume percent oxygen content required in an oxygen/nitrogen mixture to maintain combustion of a vertical, top-lighted test specimen. The value is expressed in mathematical terms as follows:

$$LOI = \frac{[O_2]}{[O_2] + [N_2]} \times 100$$

where $[O_2]$ is the concentration of oxygen and $[N_2]$ is the concentration of nitrogen. The LOI is considered to be an accurate, reproducible small-scale laboratory estimate of the flammability of materials. From a practical standpoint, an LOI value of greater than 25 to 28 generally means that the test specimen will be self-extinguishing in other small-scale tests. For a more detailed discussion of the LOI and method of determination, C. P. Fenimore and F. I. Martin's article in COMBUSTION AND FLAME 10 No. 2, page 135 (1966), should be consulted.

Limiting Oxygen Indices were obtained using the Michigan Chemical LOI apparatus. An Aminco-NBS smoke density chamber was used to obtain data on the rate of smoke generation as well as intensity of visible smoke.

EXPERIMENTAL RESULTS

EXAMPLE I

Unfilled Flexible Vinyl

| | Parts by Weight |
|---|---|
| Polyvinyl Chloride ("FPC 9326" a product of Firestone Plastics Company) | 100 |
| Calcium Stearate (lubricant) | 2 |
| Di(2-ethyl hexyl) phthalate | 50 |
| Dibutylin bis(lauryl) mercaptide ("Thermolite 20" product of M & T Chemical Co.) | 3.75 |
| Epoxy type plasticizer ("Paraplex G-60" product of Rohm & Haas Co.) | 5 |
| Manganese tetraborate (Product of City Chemical Co.; contains 23.8 Mn; theoretical 26.13% for $MnB_4O_7$) | 0, 3, or 7 (Per Table I) |

A series of compounds was made up in accordance with the above recipe, varying the manganese tetraborate from composition to composition as set out in Table I below. In each case, the several materials in the order listed were added and mixed on a laboratory roll mill at 355° F (168.5° C) and then sheeted and pressed into sheets 0.030 inches (0.762 mm) thick at 335° F (168.5° C). Plaques 3 inches × 3 inches (76mm × 76mm) cut from these sheets were conditioned at 25° C and 50% relative humidity for 48 hours. Thereafter the plaques were subjected to NBS smoke density tests as described hereinabove. Also strips 0.25 inch × 5 inches × 1.0 (6.35mm × 27mm × 25.4mm) were molded and subjected to oxygen index measurements as described above. The tests in this example were conducted in the "flaming" mode, i.e., with a burner flame playing on the sample in addition to the radiation from the radiant heater.

TABLE I

| Parts of $MnB_4O_7$ Used | TEST RESULTS | | | | Run No. |
|---|---|---|---|---|---|
| | $D_{mc}$ | $t.9D_m$ | $tD_{16}$ | $SON_4$ | |
| 0 | 689 | 1.87 | 0.28 | 612 | 1 |
| 3 | 532 | 2.62 | 0.28 | 455 | 2 |
| 7 | 507 | 2.53 | 0.27 | 431 | 3 |

From the table it will be apparent that the maximum density of smoke ($D_{mc}$) and the smoke obscuration ($SON_4$) decreased in the presence of the manganese borate. Complementarily, the time to nine-tenths maximum density, which is an inverse measure of the rapidity of smoke generation, increased over the interval from 0 to 3 parts, and decreased only slightly over the interval from 3 to 7 parts.

EXAMPLE II

Filled Flexible Vinyl

| | Parts by Weight |
|---|---|
| Polyvinyl chloride resin ("FPC-9300) a product of Firestone Plastics Company) | 100 |
| Dialkyl phthalate | 45 |
| Powdered tribasic lead sulfate | 5 |
| Dibasic lead stearate | 0.5 |
| Hydrocarbon Wax lubricant | 0.5 |
| Calcium carbonate | 35.0 |
| Titanium dioxide | 2.0 |
| Manganese tetraborate (Synthesized in the laboratory from $MnCl_2$ and borax in aqueous solution; 26.2% Mn, theoretical 26.13% for $MnB_4O_7$) | 0 or 5 (Per Table II) |

A series of compounds made up in accordance with the above formulation, using or omitting the manganese borate in the several runs as indicated in Table II. In each case, the several materials in the order listed, were compounded on a laboratory roll mill at 335° F (168.5° C) and then sheeted and pressed into sheets approximately 0.30 inches (0.762 mm) thick at 335° F (168.5° C). Plaques 3 inches × 3 inches (76 mm × 76mm) cut from these sheets were conditioned at 25° C and 50% humidity for 48 hours. Thereafter, the plaques were submitted to NBS smoke density tests as described hereinabove, some tests being conducted under flaming conditions ("F") and some under non-flaming conditions ("NF") as indicated in the Table II. Also strips were molded having the dimensions 0.25 inch × 5 inches × 1.0 inch (6.35mm × 1.27mm × 25.4mm) and were subjected to oxygen index measurements. Following are the results of the tests.

TABLE II

NBS SMOKE CHAMBER TESTS

| Parts $MnB_4O_7$ Used | Conditions of Test | $D_{mc}$ | $t.9D_m$ | $tD_{16}$ | $SON_4$ | LOI | RUN NO. |
|---|---|---|---|---|---|---|---|
| 0 | F | 327 | 1.95 | 0.31 | 271 | 29.5–30.0 | 4 |
| 5 | F | 212 | 1.22 | 0.33 | 190 | 33.0–33.5 | 5 |
| 0 | NF | 192 | 8.01 | 1.06 | 131 | — | 6 |
| 5 | NF | 154 | 6.34 | 0.65 | 123 | — | 7 |

Comparing Runs Nos. 4 and 5 of Table II, runs in the flaming mode, it will be seen that the $D_{mc}$ and $SON_4$ were greatly reduced by the presence of the manganese borate. Also, the LOI figure was increased. Comparing runs Nos. 6 and 7, conducted in the non-flaming mode, it will be apparent that the $D_{mc}$ and $SON_4$ figures were decreased by the presence of the manganese borate.

EXAMPLE III

Rigid Vinyl

| | Parts by Weight |
|---|---|
| Polyvinyl chloride resin ("FPC 965" a product of The Firestone Tire & Rubber Company) | 100 |
| Calcium stearate | 2 |
| Dibutyltin bis(lauryl) mercaptide ("Thermolite 20", product of M & T Chemical Co.) | 3.75 |
| Manganese borate (produced by reaction of $MnCl_2$ plus borax) | 0 or 5 (Per Table III) |

A series of compounds was made in accordance with the above recipe, using or omitting the manganese borate as indicated in Table III hereinbelow. In each case, the several materials, in the order listed, were added and mixed on a laboratory roll mill at 335° F (168.5° C) and then sheeted and pressed into sheets approximately 0.030 inches (0.762 mm) thick at 335° F (168.5° C), and 3 inches × 3 inches (76mm × 76mm) plaques cut from these sheets conditioned at 25° C and 50% relative humidity for 48 hours. Thereafter, the plaques were submitted to NBS smoke density tests under flaming conditions as described hereinabove. Also strips having dimensions of 0.25 inch × 5 inch × 1.0 inch (6.35mm × 1.27mm × 25.4mm) were molded and subjected to oxygen index measurements as described above. Following are the results of these tests.

TABLE III

| Manganese borate used (parts) | TEST RESULTS | | | | |
|---|---|---|---|---|---|
| | $D_{mc}$ | $t.9D_m$ | $tD_{16}$ | $SON_4$ | LOI |
| 0 | 438 | 2.95 | 0.40 | 315 | 42.9 |
| 5 | 335 | 2.80 | 0.45 | 243 | 43.5 |

The results indicated a slight improvement in flame resistance when the manganese borate is used, as indicated by increased LOI, and significant decrease in visible smoke intensity as reflected in lower $D_{mc}$ and $SON_4$.

What is claimed is:

1. A flexible, smoke inhibited polymer composition containing:
   1. 100 parts by weight of a polymer having a chlorine content of 10 to 75%, based on the weight of the polymer, said polymer being selected from the group consisting of vinyl chloride polymers, chlorinated polyethylene and chlorinated polypropylene, and
   2. 1 to 10 parts by weight manganese borate and
   3. 25 to 150 parts by weight of a plasticizer.

2. A composition according to claim 6 wherein said polymer is polyvinyl chloride.

3. A composition according to claim 1 wherein said polymer is chlorinated polyethylene.

4. A composition according to claim 1 wherein said polymer is chlorinated polypropylene.

5. A composition according to claim 1 containing 4 to 8 parts of said manganese borate.

6. A rigid, smoke inhibited polymer composition containing:
   1. 100 parts by weight of a vinyl chloride polymer having a chlorine content of 10 to 75%, based on the weight of said polymer, and
   2. 5 parts by weight manganese borate, and
   3. 2 parts by weight calcium stearate, and
   4. 3.75 parts by weight dibutyltin bis(lauryl) mercaptide.

7. A composition according to claim 6 wherein said vinyl chloride polymer is polyvinyl chloride.

* * * * *